US011226797B2

(12) United States Patent
Viswanath (10) Patent No.: US 11,226,797 B2
(45) Date of Patent: Jan. 18, 2022

(54) REPRESENTATION AND ANALYSIS OF WORKFLOWS USING ABSTRACT SYNTAX TREES

(71) Applicant: Chaldal, Inc., San Francisco, CA (US)

(72) Inventor: Tejas Viswanath, San Francisco, CA (US)

(73) Assignee: Chaldal, Inc., San Francisco, CA (US)

(*) Notice: Subject to any disclaimer, the term of this patent is extended or adjusted under 35 U.S.C. 154(b) by 237 days.

(21) Appl. No.: 16/421,686

(22) Filed: May 24, 2019

(65) Prior Publication Data

US 2019/0361685 A1    Nov. 28, 2019

Related U.S. Application Data

(60) Provisional application No. 62/676,240, filed on May 24, 2018.

(51) Int. Cl.
*G06F 8/41* (2018.01)

(52) U.S. Cl.
CPC .................................. *G06F 8/427* (2013.01)

(58) Field of Classification Search
None
See application file for complete search history.

(56) References Cited

U.S. PATENT DOCUMENTS

| | | | | |
|---|---|---|---|---|
| 8,458,662 B2* | 6/2013 | Grechanik | ............ | G06F 11/368 717/124 |
| 8,516,458 B2* | 8/2013 | Stewart | ................... | G06F 8/427 717/144 |
| 8,776,029 B2* | 7/2014 | Puthuff | ............... | G06F 11/3612 717/131 |
| 9,152,668 B1* | 10/2015 | Moskovitz | ........ | G06F 16/24532 |
| 2009/0177449 A1* | 7/2009 | Benayon | ................. | G06F 17/10 703/2 |
| 2011/0307864 A1* | 12/2011 | Grechanik | .......... | G06F 11/3604 717/124 |
| 2017/0154088 A1* | 6/2017 | Sherman | ............... | G06F 16/212 |
| 2017/0161129 A1* | 6/2017 | Johnson | .............. | G06F 11/0793 |
| 2017/0220455 A1* | 8/2017 | Badran | ............... | G06F 11/3684 |
| 2017/0277800 A1* | 9/2017 | Lucas | .................. | G06F 11/3668 |
| 2018/0341571 A1* | 11/2018 | Kislovskiy | ................ | G06F 8/65 |

(Continued)

OTHER PUBLICATIONS

D. Darvas, E. B. Viñuela and I. Majzik, "PLC code generation based on a formal specification language," 2016 IEEE 14th International Conference on Industrial Informatics (INDIN), 2016, pp. 389-396. (Year: 2016).*

(Continued)

*Primary Examiner* — Andrew M. Lyons
(74) *Attorney, Agent, or Firm* — Cognition IP, P.C.; Edward Steakley (57) ABSTRACT

A workflow for an operational process may be defined using a functional programming language. A computer system may parse the workflow to generate an abstract syntax tree, which may include states of the workflow and transitions from one workflow state to another. The computer system may generate code paths from the abstract syntax tree representing sequences of execution. Reflection on the workflow may be performed using the abstract syntax tree and code paths to allow intelligent decision-making.

18 Claims, 5 Drawing Sheets

(56) References Cited

U.S. PATENT DOCUMENTS

2019/0079740 A1\* 3/2019 Sharma ............... G06F 16/9535
2019/0095314 A1\* 3/2019 Tian .................... G06F 11/3608

OTHER PUBLICATIONS

B. Hempel, J. Lubin, G. Lu and R. Chugh, "Deuce: A Lightweight User Interface for Structured Editing," 2018 IEEE/ACM 40th International Conference on Software Engineering (ICSE), 2018, pp. 654-664. (Year: 2018).\*

\* cited by examiner

REPRESENTATION AND ANALYSIS OF WORKFLOWS USING ABSTRACT SYNTAX TREES

CROSS-REFERENCE TO RELATED APPLICATIONS

This application claims the benefit of U.S. Provisional Patent Application No. 62/676,240, filed May 24, 2018, which is hereby incorporated by reference in its entirety.

FIELD OF THE INVENTION

The present invention relates to the use of abstract syntax trees to represent workflows and to analyze said workflows.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Workflows can be used to represent operations in a wide variety of industries from logistics to software development. A workflow helps organize information about processes and allows analysis and reasoning about the processes. Existing methods of representing workflows have several major disadvantages.

One method of representing workflows is not formalize them as state machines and instead describe the workflows ad hoc in software code. Automated analysis of the workflow is generally not possible in this case. Analysis would have to be designed separately for each use case.

Other methods of representing workflows are to represent the workflow as state machines but without full encodings of the transitions between states. Although the basic states of the workflow may be known, the transitions are not identified with precision, and it is not possible to determine the free and bound variables involved in a state machine transition. Because of the lack of transition information, limited analysis can be performed automatically on these workflows.

Another existing method of representing workflows is to do so with a non-code format, such as Extensible Markup Language (XML). States may be represented in the non-code format, but the use of a non-code language significantly limits the expressive power of transition functions. While some systems may allow writing custom functions as transitions, the custom functions are opaque and cannot be automatically analyzed in the same process as the state functions. It cannot be automatically determined what operations the custom functions perform, what variables they depend on, and other features.

It would be desirable to develop a more effective representation of workflows using abstract syntax trees that allows more effective reasoning and analysis of the workflows.

SUMMARY OF THE INVENTION

Embodiments of the invention relate to representing workflows using abstract syntax trees. The abstract syntax tree may be used for various forms of reflection and analysis of the workflow in a seamless manner.

One embodiment relates to a method for building an abstract syntax tree and code paths. A computer file may be provided representing a workflow in a functional programming language. A computer system may parse the file, identify workflow states, and generate state transition functions that specify transitions from one workflow state to another workflow state. The computer system may generate an abstract syntax tree from the workflow states and transition functions. From the abstract syntax tree, the computer system may generate code paths representing sequences of execution. The workflow may be executed as code, and the code paths updated as new input values are bound to input variables of functions.

The code paths may be used for reflection and analysis about what code paths are available or what actions can be performed. Moreover, historical data may be provide from past runs of the workflow to allow the system to automatically choose optimal actions to perform.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments herein relate to representing a workflow in an abstract syntax tree. An operator may define the workflow in a programming language, such as a functional programming language. Functional programming languages are programming languages that treat computer programs as the evaluation of mathematical functions and avoids state changes and side effects. Side effects refer to the storage of data and causing of effects other than the return of data from a function. Functional languages that may be used herein include Lisp, Scheme, Haskell, Erlang, OCaml, and others. Alternatively, an operator may define a workflow using a visual interface, and a computer program may translate the visually defined workflow into a programming language.

Figure 1:
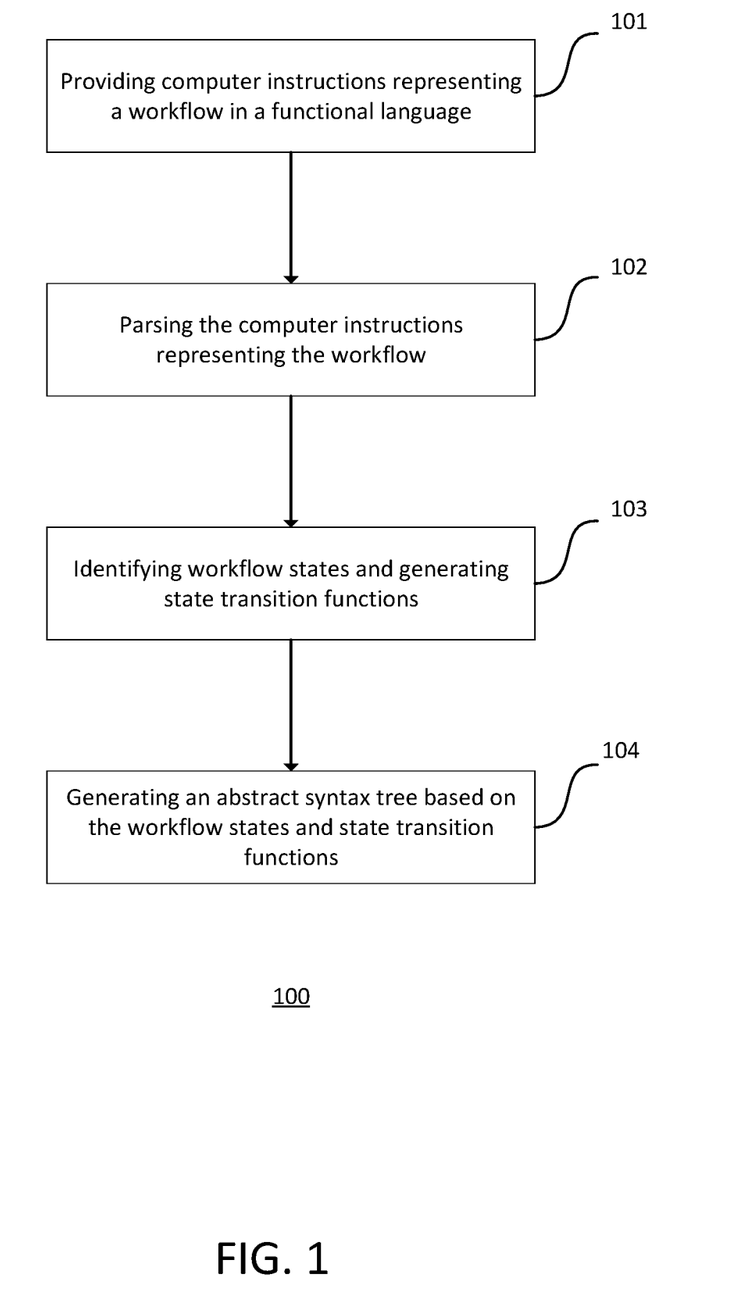
FIG. 1 illustrates an exemplary method for generating an abstract syntax tree from a workflow defined in a programming language.

FIG. 1 illustrates an exemplary method 100 performed by a computer system for generating an abstract syntax tree from computer code representing a workflow. Step 101 comprises providing a file of computer instructions representing a workflow in a functional programming language. Optionally, such a workflow may be defined using one or more recursive function calls of pure functions that have no side effects.

In step 102, the computer system parses the file comprising the instructions representing the workflow. During parsing, the file may be tokenized into tokens. The computer system may iterate over the tokens and operate on them.

In step 103, during parsing, the computer system may identify one or more workflow states from the file. States define a state of the workflow after functions or operations have been performed. During parsing, the computer system may also generate one or more state transition functions that specify the transitions from one workflow state to another workflow state.

State transition functions may be pure functions in the form $S_1$->A->$C_1$->R<Option($S_2$*$C_2$)>. Each state transition function takes as input a source state $S_1$, an action A, and context data $C_1$ and returns a new state $S_2$ and updated context $C_2$ with the result value wrapped inside a container of type R. A state transition function may output the empty set if no transition is possible. State transitions may be thought of as actions, whose output depends on the current state and context.

Pure functions have two properties. First, they always evaluate to the same return value given the same argument value(s). The function result value cannot depend on any hidden information or state that may change while program execution proceeds or between different executions of the program, nor can it depend on any external input from I/O devices. Second, the evaluation of the function does not cause any semantically observable side effect or output; in other words, there are no mutations of mutable objects or output to I/O devices.

In step 104, the computer system generates an abstract syntax tree based on the workflow states and the one or more state transition functions. An abstract syntax tree may be represented in the same functional programming language as the workflow or in other programming languages. Classes and structs may be used as data structures for representing the abstract syntax tree.

Figure 2:
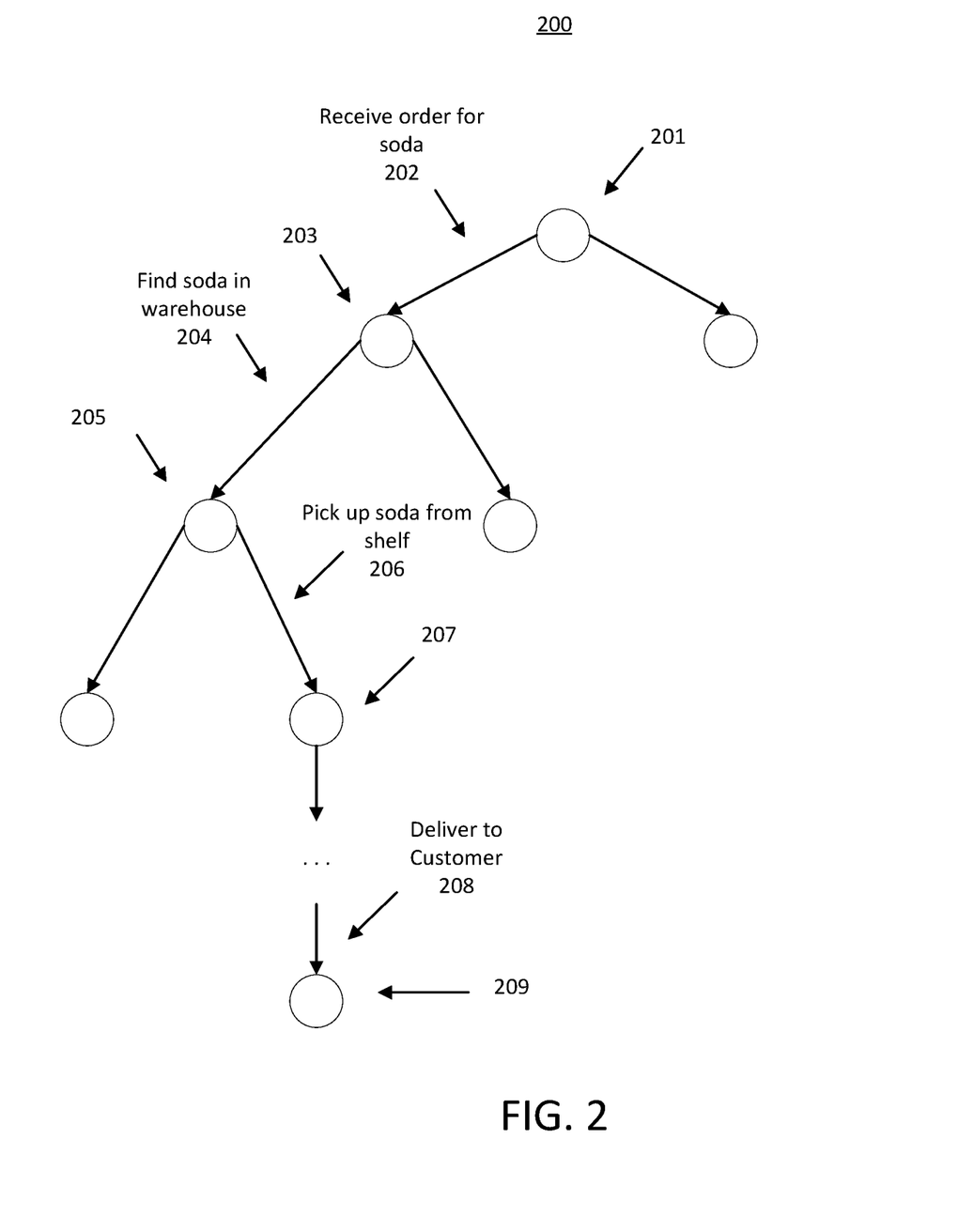
FIG. 2 illustrates an exemplary abstract syntax tree representing a workflow.

FIG. 2 illustrates an exemplary abstract syntax tree 200 that may be generated using method 100 and represents an exemplary workflow for receiving an e-commerce order and delivering it to the customer. The abstract syntax tree includes nodes, such as nodes 201, 203, 205, 207, and 209, and transitions, such as transitions 202, 204, 206, and 208. An initial, or root, state 201 is provided where the workflow starts. Some states may have a single outgoing transition, and other states may have multiple outgoing transitions to other states. In state 201, one transition 202 is receiving an order for a soda, which brings the workflow to state 203 defining a state where an order for soda has been received. In state 203, one transition 204 is finding the soda in a warehouse, which brings the workflow to state 205 defining a state where the soda has been located. In state 205, one transition 206 is picking up soda from the shelf, which brings the workflow to state 207 defining a state where the soda has been picked up. Further transitions and states may follow until a final transition 208 of delivering the soda to a customer bringing the system to state 209, an end state where the order is complete. State 209 is a leaf or end state with no further outgoing transitions. While the abstract syntax tree 200 has only a small number of nodes it should be understood that, in practice, an abstract syntax tree for a workflow may have many states and transitions. For example, in at least some embodiments, the workflows may have 30 to 50 states and actions. In some embodiments, the workflows may have more than 50 states and actions.

Transitions may be defined not just for particular actions but may also include other information, such as the employee performing the action or other parameters related to the action. In one embodiment, different transitions may be provided from a state for different employees performing the action, such as "Charles picks up the soda from the shelf" or "Anne picks up the soda from the shelf." Alternatively, a single transition may be provided with different context information that may be provided to identify the employee performing the action.

In one embodiment, other parameters related to the action may be represented with different transitions, such as providing a first transition from a state for finding soda in warehouse A and a second transition from said state for finding soda in warehouse B. Alternatively, a single transition may be provided with different context information that may be provided to specify the different parameters such as the identity of the warehouse.

Providing different transitions, or different context, for employees or other parameters allows tracking and analyzing the workflow according to performance by the employees or based on the other parameters. For example, the employee or other parameters may affect the success probability of successfully completing the transition and the time it takes to complete the transition in the workflow. Some employees may perform more successfully or more quickly at certain tasks in the workflow than others. Moreover, other variables, such as the identity of the warehouse, may also affect the success rate and time taken.

Once a workflow has been represented as an abstract syntax tree, the workflow can reflect upon itself and various operations may be automatically performed, such as automatically finding the most efficient path from a source state to a desired target state. Artificial intelligence may be applied to the abstract syntax tree to determine optimal paths or actions to take.

Figure 3:
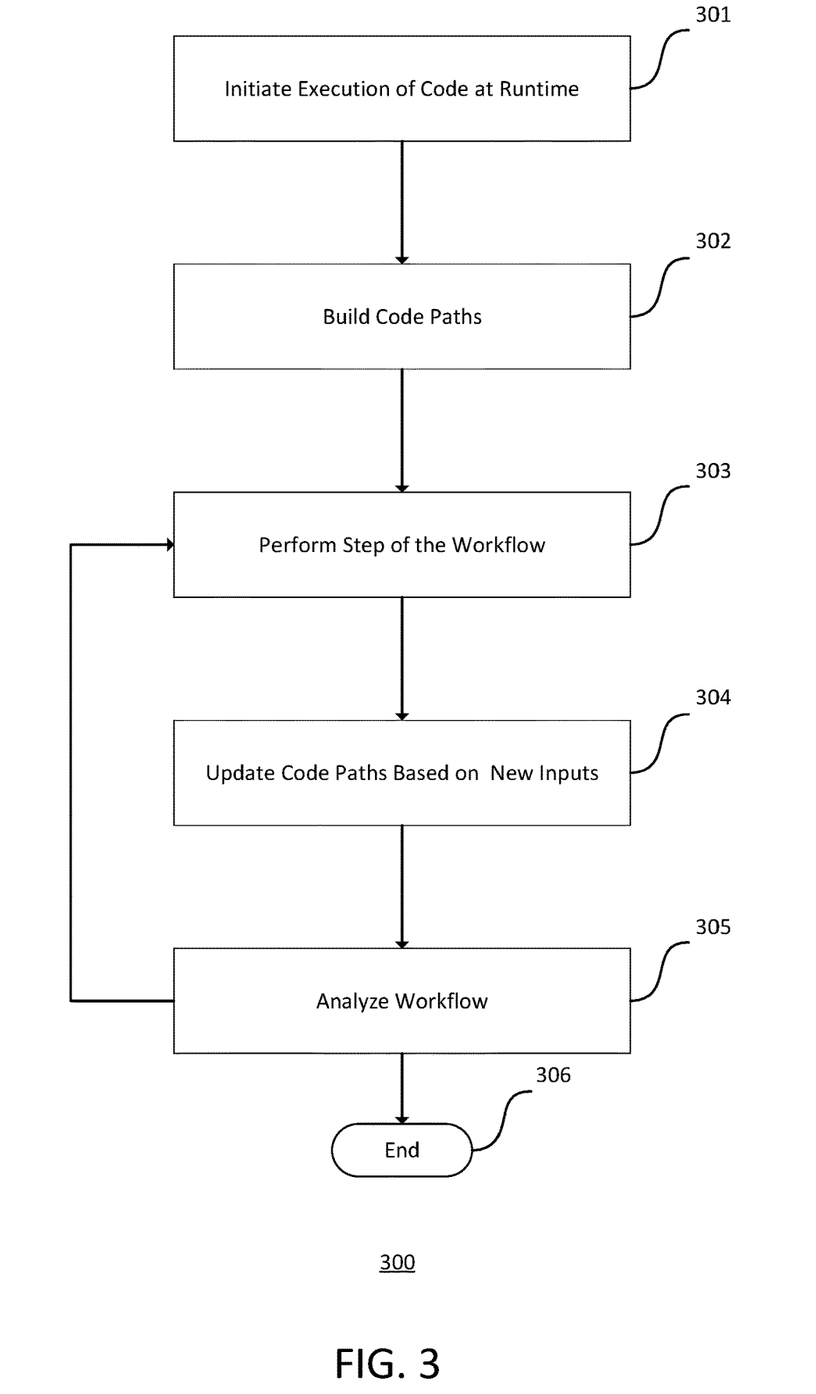
FIG. 3 illustrates an exemplary method for generating code paths from an abstract syntax tree at runtime.

FIG. 3 illustrates an exemplary method 300 that may be performed by a computer system at runtime of the code representing the workflow. The method 300 may allow analysis of the workflow during runtime. In step 301, execution of the code is initiated. In step 302, the computer system may build, from the abstract syntax tree, one or more code paths. Each code path represents a potential sequence of execution in the workflow. A sequence of execution is a series of statements that are executed starting from the input values to a function and resulting in the return values of the function.

Two potential types of code paths may exist, depending on whether a function branches or not due to control flow statements such as IF/THEN/ELSE statements. If a function has no control flow statements that evaluate to a jump instruction based on a condition, such as IF/THEN/ELSE statements, for loops, while loops, and ternary operators, then only one code path exists, which includes all the statements within the function. If a function has control flow statements, then the computer system forks and generates a code path for each conditional path based on each condition outcome. The number of code paths generated depends on the number of control flow statements within the abstract syntax tree.

The result of the code path generation is a set of code paths having a target state and one or more conditions that must be true for a transition to occur to the target state, where each condition may depend on one or more input variables of the source state, action, and context $(S_1, A, C_1)$. If a condition does not depend on any input variable, then the condition can be evaluated to a constant during code path generation and eliminated. The code path generation process 302 need only occur once during runtime so long as the underlying code and abstract syntax tree do not change.

In step 303, one or more steps of the workflow may be performed. Some steps of the workflow may be automatically completed by the computer system, such as assigning a task to a human worker or charging a credit card. Others may require human input or interaction, such as waiting to receive an order from an e-commerce website or payment information from a customer. Still others may require input from sensors or other computer systems in the environment, for example a confirmation from a sensor or computer system that a product was picked up in a warehouse or sent out for delivery. The workflow may naturally pause at points where human input or input from sensors or other computer systems is needed and resume when the appropriate input is received.

In step 304, additional inputs may be determined, such as from the execution of the workflow, from environmental sensors, or from user inputs. The input values may be used to update the code paths. The input variables in the code paths may be replaced with the input values (in other words, input values are bound to the input variables) and re-evaluation may be performed on the code paths. For example, some conditions on the code paths that had been unknown may now be determined to be true or false based on the new input values.

In step 305, the workflow may be analyzed by using the code paths and the abstract syntax tree. In one form of reflection on the abstract syntax tree, a source state may be provided, and the computer system may determine all potential code paths from the source state to a target state and the required conditions that must be met for each code path to reach the desired target state. In another from of reflection, a source state may be provided and, optionally, context data. The computer system may filter the potential actions available to determine which actions may be performed from the source state based on the context and the code paths from the source state.

In some embodiments, analysis of the workflow may be performed to influence choices made by the system in progressing in the workflow. When presented with an option of a plurality of actions to perform in the workflow, the computer system may use determinations of potential code paths and actions to perform, as well as their likelihood of success, likely time to completion, and other metrics to select an action from the plurality of actions to perform. The computer system may select appropriate actions to optimize probability of success and time to completion.

The process ends when the workflow completes at step 306.

Figure 4:
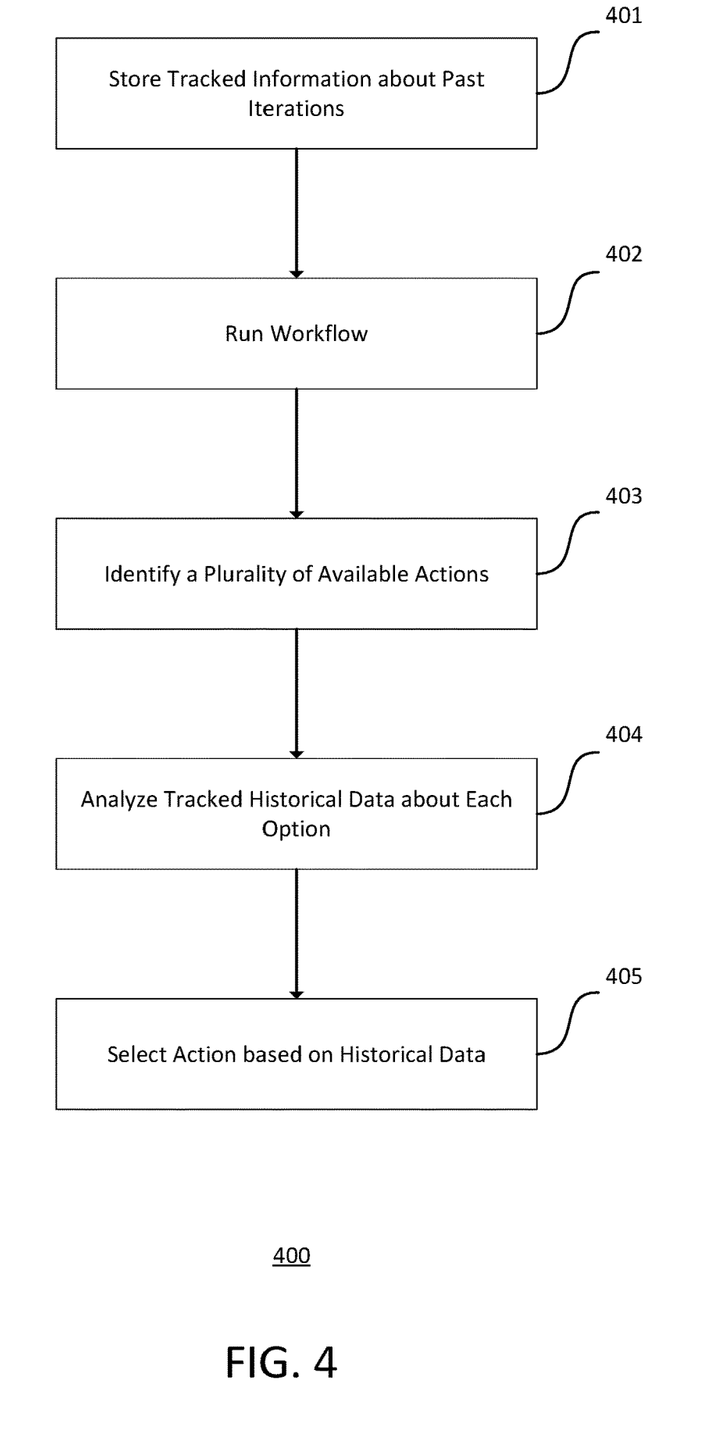
FIG. 4 illustrates an exemplary method of tracking information from past iterations of a workflow and using that information to select actions to perform in the workflow.

FIG. 4 illustrates an exemplary method 400 that may be performed by a computer system to automatically optimize the performance of a workflow through analysis of historical data from prior iterations of the workflow.

In step 401, the computer system may store tracked information about prior iterations of the workflow. For example, the computer system may store information about whether the workflow was successful or unsuccessful and how long it took to complete the workflow. A database may be provided, and the computer system may store in the database information about success rates and completion time. In some embodiments, the database may store information per transition to identify the past historical success rate of that transition and the time to complete that transition. The historical information may be provided as averages, means, medians, modes, or other statistical information or metrics.

In step 402, the workflow may be run and one or more code paths of the workflow may be updated during runtime. The time to completion and success of each action may be monitored and then updated in the database. At some point during execution, a fork may be reached at a state where a plurality of actions are available and the computer system must decide which action to perform (step 403).

In step 404, the tracked historical information may be retrieved from the database to analyze historical information about the available actions. The computer system may compute a predicted success rate or time to completion to transition from the present state to a target state for each of the available actions by using the stored information about the success rate or time to completion for each transition on the code path involving the action from the present state to the target state.

In step 405, an action may be selected from the available actions based on the predicted success rate or time to completion.

In some embodiments, the computer system may use historical information or past configuration to determine when the workflow has reached an exceptional situation and send an alert to an operator.

Figure 5:
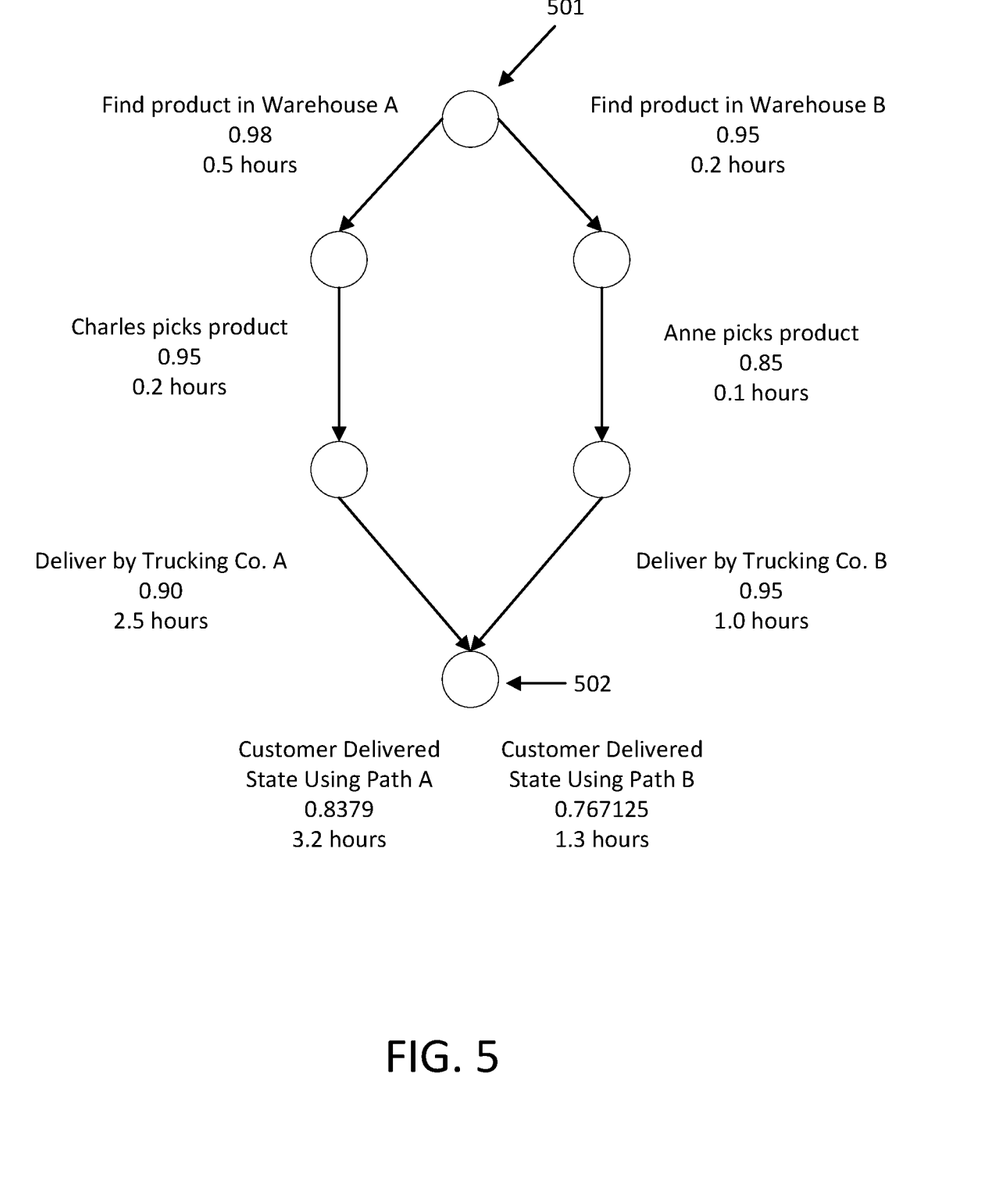
FIG. 5 illustrates an example of reflection performed on a workflow using code paths.

FIG. 5 illustrates an example of how success rates and time to completion may be predicted based on different available actions. At state 501, the computer system is presented with two options in a workflow, to find a product for delivery from Warehouse A or Warehouse B. Based on the choice of Warehouse A or Warehouse B, different future actions are available, such as assigning the picking of the product to Charles, who works in Warehouse A, or to Anne, who works in Warehouse B. Likewise, the warehouses are served by different trucking companies. In this example, each transition is associated with a success rate and a completion time, which provides the probability of success of the transition and the historical time to complete transition. By combining the success rate and completion time for each transition on path A and path B to traverse a path from start state 501 to end state 502 a success rate and completion time for the entire process on path A and path B may be determined. The overall success rate is determined by multiplying the probabilities of each transition on the path, and the overall time to completion is determined by adding the times to complete each transition on the path. The computer system may choose follow path A or path B based on their predicted success rates or completion times.

In additional embodiments, a computer system may be used to generate a user interface from the abstract syntax tree and code paths. The computer system iterates over the states of the abstract syntax tree and code paths and determines the states at which user input is required. The computer system then automatically generates a user interface with user interface elements to receive the user input identified in the workflow. The user interface is then presented at the appropriate times in the workflow with the user interface elements for receiving the necessary user input. The user interface may automatically disappear at steps of the workflow where user input is not required.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A computer-implemented method for building an abstract syntax tree and one or more code paths for a workflow, the method comprising:
   providing a file comprising computer instructions representing a workflow in a functional programming language;
   parsing the file representing the workflow;
   identifying workflow states from the file representing the workflow;
   generating one or more state transition functions that specify the transitions from one workflow state to another workflow state, the transitions based on an action and a context;
   generating an abstract syntax tree based on the workflow states and the one or more state transition functions;
   building, from the abstract syntax tree, one or more code paths, each code path representing a potential sequence of execution in the workflow;
   automatically generating, based on the abstract syntax tree, a user interface to receive one or more user inputs for the workflow; and
   iteratively executing the workflow and updating the one or more code paths based on the one or more user inputs.

2. The computer-implemented method of claim 1, wherein the file defines the workflow using one or more recursive function calls that have no side effects.

3. The computer-implemented method of claim 1, wherein the one or more state transition functions are pure functions that have no side effects.

4. The computer-implemented method of claim 1, wherein the abstract syntax tree is represented in the same functional programming language as the file representing the workflow.

5. The computer-implemented method of claim 1, further comprising:
   providing a source state and a target state; and
   determining one or more code paths and required conditions to reach the target state from the source state.

6. The computer-implemented method of claim 1, further comprising:
   providing a source state and a context; and
   determining a set of actions that may be performed in the source state based on the context and the one or more code paths.

7. The computer-implemented method of claim 1, further comprising:
   providing one or more environmental sensors; and
   iteratively executing the workflow and updating the one or more code paths based on one or more inputs from the environmental sensors.

8. The computer-implemented method of claim 1, further comprising:
   storing information about the success rate of transitions between states in the abstract syntax tree, where the transitions are associated with actions;
   iteratively executing the workflow and updating the one or more code paths, until a first state is reached where a plurality of actions are available;
   computing a predicted success rate to transition from the first state to a second state for each of the plurality of available actions by using the stored information about the success rate of transitions for each transition on the code path involving the action from the first state to the second state; and
   selecting an action from the plurality of actions based on the predicted success rates.

9. The computer-implemented method of claim 1, further comprising:
   storing information about the time for transitions between states in the abstract syntax tree, where the transitions are associated with actions;
   iteratively executing the workflow and updating the one or more code paths, until a first state is reached where a plurality of actions are available;
   computing a predicted time to transition from the first state to a second state for each of the plurality of available actions by using the stored information about the time to transition for each transition on the code path involving the action from the first state to the second state; and
   selecting an action from the plurality of actions based on the predicted times.

10. A non-transitory computer-readable medium, the non-transitory computer-readable medium comprising instructions for:
    providing a file comprising computer instructions representing a workflow in a functional programming language;
    parsing the file representing the workflow;
    identifying workflow states from the file representing the workflow;
    generating one or more state transition functions that specify the transitions from one workflow state to another workflow state, the transitions based on an action and a context;
    generating an abstract syntax tree based on the workflow states and the one or more state transition functions;
    building, from the abstract syntax tree, one or more code paths, each code path representing a potential sequence of execution in the workflow;

automatically generating, based on the abstract syntax tree, a user interface to receive one or more user inputs for the workflow; and iteratively executing the workflow and updating the one or more code paths based on one or more user inputs.

11. The non-transitory computer-readable medium of claim 10, wherein the file defines the workflow using one or more recursive function calls that have no side effects.

12. The non-transitory computer-readable medium of claim 10, wherein the one or more state transition functions are pure functions that have no side effects.

13. The non-transitory computer-readable medium of claim 10, wherein the abstract syntax tree is represented in the same functional programming language as the file representing the workflow.

14. The non-transitory computer-readable medium of claim 10, further comprising instructions for:
   providing a source state and a target state; and
   determining one or more code paths and required conditions to reach the target state from the source state.

15. The non-transitory computer-readable medium of claim 10, further comprising instructions for:
   providing a source state and a context; and
   determining a set of actions that may be performed in the source state based on the context and the one or more code paths.

16. The non-transitory computer-readable medium of claim 10, further comprising instructions for:
   providing one or more environmental sensors; and
   iteratively executing the workflow and updating the one or more code paths based on one or more inputs from the environmental sensors.

17. The non-transitory computer-readable medium of claim 10, further comprising instructions for:
   storing information about the success rate of transitions between states in the abstract syntax tree, where the transitions are associated with actions;
   iteratively executing the workflow and updating the one or more code paths, until a first state is reached where a plurality of actions are available;
   computing a predicted success rate to transition from the first state to a second state for each of the plurality of available actions by using the stored information about the success rate of transitions for each transition on the code path involving the action from the first state to the second state; and
   selecting an action from the plurality of actions based on the predicted success rates.

18. The non-transitory computer-readable medium of claim 10, further comprising instructions for:
   storing information about the time for transitions between states in the abstract syntax tree, where the transitions are associated with actions;
   iteratively executing the workflow and updating the one or more code paths, until a first state is reached where a plurality of actions are available; and
   computing a predicted time to transition from the first state to a second state for each of the plurality of available actions by using the stored information about the time to transition for each transition on the code path involving the action from the first state to the second state;
   selecting an action from the plurality of actions based on the predicted times.

\* \* \* \* \*